United States Patent
Schuler et al.

[11] Patent Number: 5,967,593
[45] Date of Patent: Oct. 19, 1999

[54] PANEL COVER FOR A FORWARD AREA OF THE FRAME OPENING OF A TOP STORAGE COMPARTMENT

[75] Inventors: Eckart Schuler; Astrid Harding, both of Sindelfingen; Jürgen Schrader, Weil im Schönbuch, all of Germany

[73] Assignee: DaimlerChrysler AG, Stuttgart, Germany

[21] Appl. No.: 08/928,665

[22] Filed: Sep. 12, 1997

[30] Foreign Application Priority Data

Sep. 12, 1996 [DE] Germany ............... 196 37 005

[51] Int. Cl.⁶ .................................................. B60J 7/20
[52] U.S. Cl. ................ 296/136; 296/107.08; 296/37.16
[58] Field of Search ................... 296/136, 107.08, 296/37.16

[56] References Cited

U.S. PATENT DOCUMENTS

| | | | |
|---|---|---|---|
| 2,559,277 | 6/1951 | Orr | 296/107.08 |
| 2,747,928 | 5/1956 | Olivier et al. | 296/107.08 |
| 2,997,337 | 8/1961 | Day et al. | 296/107.08 |
| 4,746,163 | 5/1988 | Muscat | 296/107.08 |
| 5,035,461 | 7/1991 | Zweigart | 296/107.08 |
| 5,067,768 | 11/1991 | Fischbach | 296/107.08 |
| 5,171,054 | 12/1992 | Wilson | 296/37.16 |
| 5,219,200 | 6/1993 | Orth et al. | 296/107.08 |
| 5,295,722 | 3/1994 | Bonne et al. | 296/107.08 |
| 5,533,777 | 7/1996 | Kleemann et al. | |
| 5,542,735 | 8/1996 | Fürst et al. | 296/107.08 |
| 5,558,389 | 9/1996 | Rothe et al. | 296/107.08 |
| 5,620,226 | 4/1997 | Sautter, Jr. | 296/107.08 |
| 5,654,615 | 8/1997 | Brodsky | 296/107.08 |
| 5,743,587 | 4/1998 | Alexander et al. | 296/136 |
| 5,769,483 | 6/1998 | Danzl et al. | 296/107.08 |
| 5,785,375 | 7/1998 | Alexander et al. | 296/136 |
| 5,810,422 | 9/1998 | Corder et al. | 296/136 |
| 5,823,606 | 10/1998 | Schenk et al. | 296/136 |

FOREIGN PATENT DOCUMENTS

4446483A1  6/1996  Germany .

OTHER PUBLICATIONS

Search Report Dec. 1997, Great Britain.

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

A panel cover assembly is provided for a forward area of a frame opening of a top storage compartment into which, when the rear lid is open, a folding top with a fixed rear end can be folded inward. A cover panel serves as a parcel shelf when the top is closed, which cover panel is displaced rearward when the top is opened. Side flaps are arranged with mirror symmetry and articulated to ends of the cover panel. Mechanical forced control of the folding motion of the side flaps is provided as a function of the position of the cover panel that is displaceable in the lengthwise direction of the vehicle. The side flaps are constantly urged by springs in an upwardly folded direction and are each foldable downwardly and backwardly into their covering positions by a tensioning cable that is secured to the forward end by displacement of the cover panel rearward into its covering position. A deflecting guide structure for the corresponding tensioning cable fastened to the side flap at its rear end being provided on the lateral end areas of the cover panel.

9 Claims, 3 Drawing Sheets

PANEL COVER FOR A FORWARD AREA OF THE FRAME OPENING OF A TOP STORAGE COMPARTMENT

BACKGROUND AND SUMMARY OF THE INVENTION

This application claims the priority of German application 196 37 005.1-21 filed in Germany on Sep. 12, 1996, the disclosure of which is expressly incorporated by reference herein.

The invention relates to a panel cover for a forward area of the frame opening of a top storage compartment.

A panel cover of the kind generally contemplated by the present invention is already known from German Patent Document DE 44 46 483 A1. In order to control the upward folding movement of the side flaps as a function of the position of the panel cover, the side flaps each have associated with them a lever mechanism with link guidance that is moved by actuating a corresponding Bowden cable.

The actuation of the side flaps using a lever mechanism with control by a cable is technically expensive and results in a correspondingly high outlay of materials, money, and assembly effort.

An object of the invention is to improve on a panel cover of the type referred to above such that the technical cost for actuation and control of its side flaps can be significantly reduced.

This object is achieved according to the invention by providing an arrangement wherein the side flaps are constantly under spring tension in an upwardly folded direction and each is capable of being folded down and back into its covering position by displacement of the cover panel rearward into its covering position by means of a cable of the tensioning cable system that is fixed at a forward end, a deflecting device being provided on lateral end areas of the cover panel for the corresponding tensioning cable fastened at its rear end to the side flap.

Other objects, advantages and novel features of the present invention will become apparent from the following detailed description of the invention when considered in conjunction with the accompanying drawings.

DETAILED DESCRIPTION OF THE DRAWINGS

Figure 1:
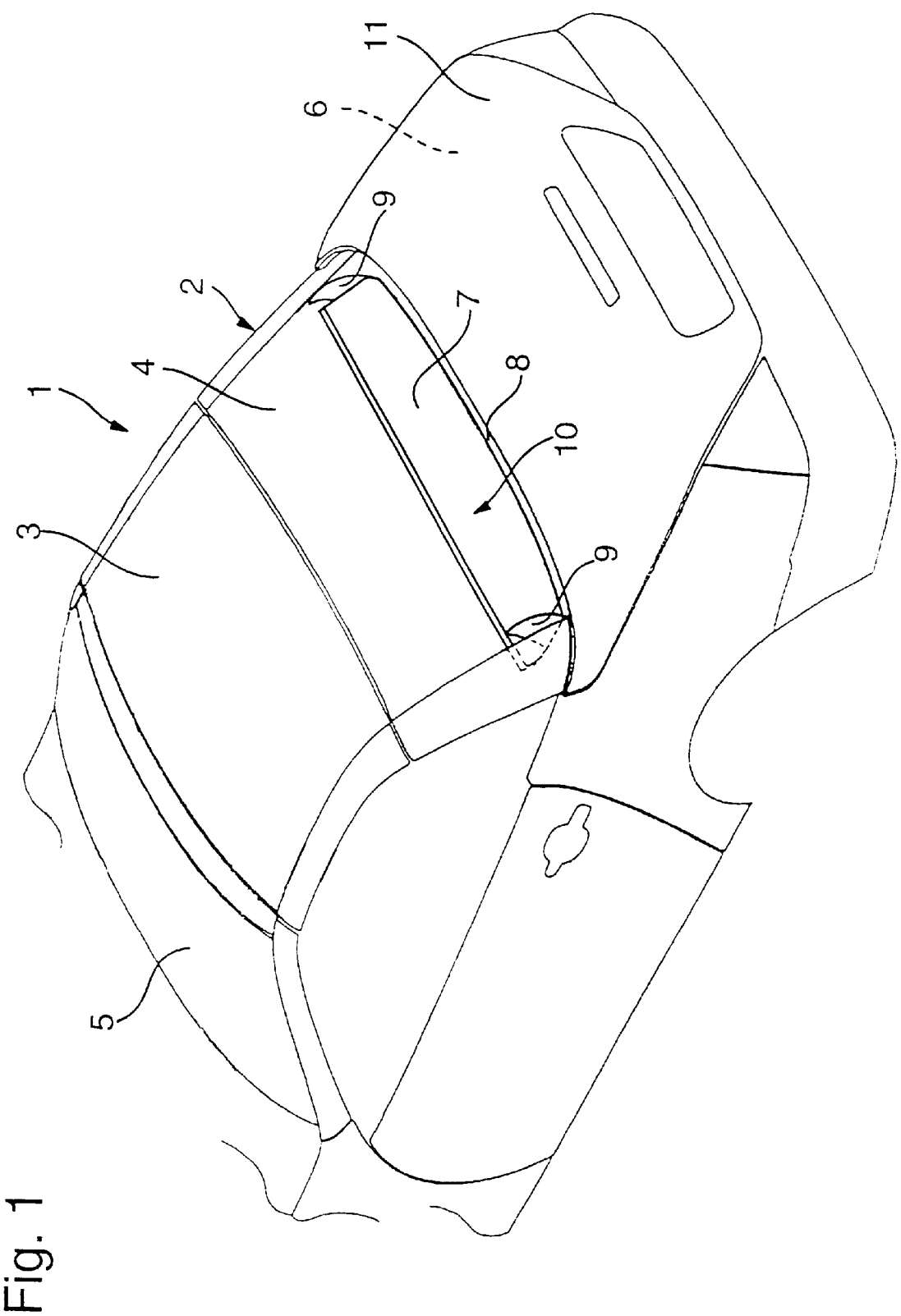
FIG. 1 is a perspective diagonal view of a rear area of a convertible with the roof closed and with a panel cover as a parcel shelf, constructed according to a preferred embodiment of the present invention.

A convertible 1 shown in FIG. 1 has a folding top designed as a two-part solid roof, said top being shown in the closed state. A forward roof part 3 of folding top 2 is articulated to a rear roof part 4 that has the rear window in it. Rear roof part 4 is mounted to pivot around a horizontal transverse axis of the vehicle in the body below the top edge of the side wall. Folding top 2 is held in the closed position by roof latches at the front, not shown, to which the leading edge of roof part 3 is mounted so that it can be released easily and which are located on the forward body frame of front windshield 5.

Behind the rear of convertible 1 is a generously dimensioned rear storage area as a storage compartment 6 for the top, into which storage compartment 6 the folding top 2 can be lowered completely when the roof is opened. The upward facing frame opening of top storage compartment 6, when folding top 2 is closed, is covered in the forward end area 6a by a cover panel 7 that forms the parcel shelf, which covers the frame opening in front of solid closing section 8 of rear roof part 4, said shape being curved in an arc. This cover panel 7, together with side flaps 9 articulated laterally thereto, forms a panel cover 10, with triangular side flaps 9 being secured inside the C-pillars of rear roof part 4 in a raised non-use position.

Behind end section 8, which likewise engages the frame opening, the frame opening is covered by a rear lid 11 whose forward edge is designed to match the curvature of end section 8 in front. Rear lid 11 can be folded upward and backward to open folding top 2 following the unlocking of locking means of known type, not shown, rotating around an essentially horizontal transverse axis of the vehicle that runs in the vicinity of the rear of the body.

Figure 2:
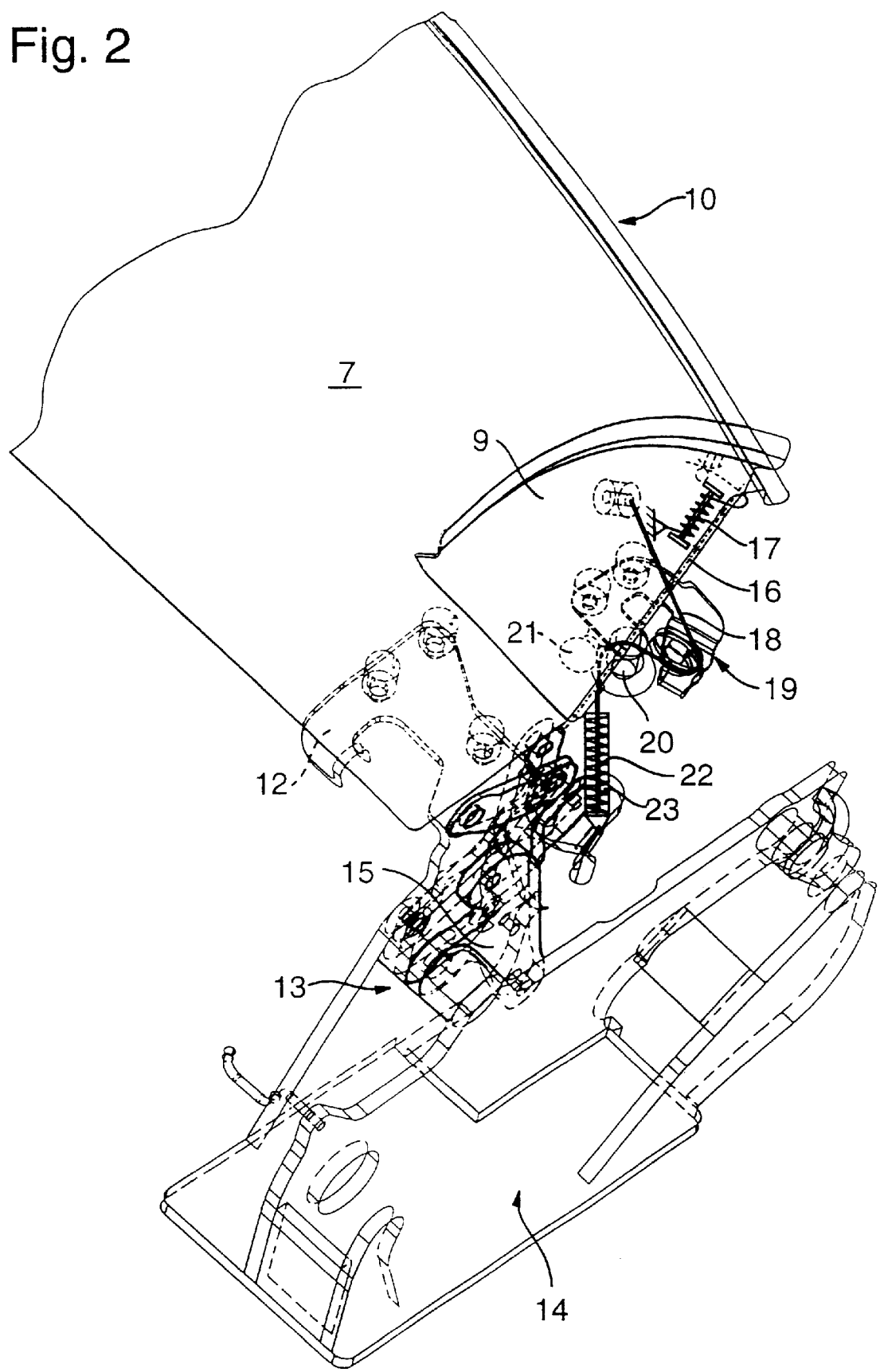
FIG. 2 is a perspective diagonal view of a left-hand end area of the panel cover with articulation to the associated bearing bracket.
Figure 3:
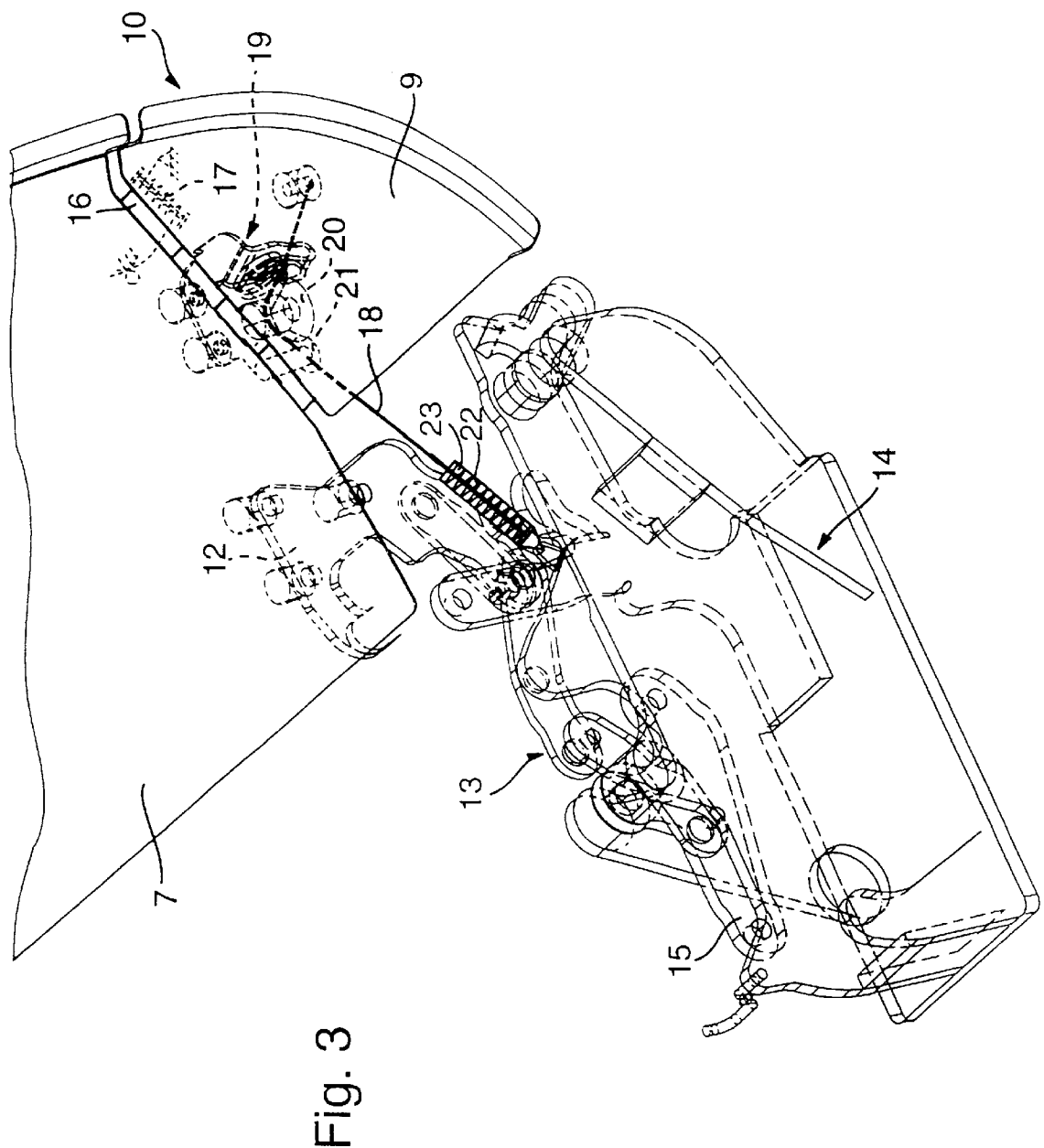
FIG. 3 shows the panel cover in a covering position, displaced rearward.

In the diagrams shown in FIGS. 2 and 3, only the left-hand end area of panel cover 10 is shown in each case. However, this is sufficient for understanding the invention since it, like folding top 2, is designed to be mirror-symmetric with respect to the central lengthwise plane of convertible 1.

Cover panel 7 is secured in the lateral end area by a fitting 12 bent downward at an angle, said fitting having its movement controlled by a rod drive 13. Rod drive 13 is mounted on associated bearing bracket 14, to which rear roof part 4 is likewise articulated, and coupled movementwise by a control lever 15 with roof part 4. Because of this movementwise coupling with folding top 2, cover panel 7 is pivoted upward and forward, both when opening and when closing folding top 2, into a release position that provides freedom for top 2 to pivot. In addition, cover panel 7, during the process of lowering folding top 2, is displaced from its position as a parcel shelf into a covering position that is displaced rearward, so that the gap that is left by end section 8 can be covered by panel cover 10.

In order for the corner areas located laterally next to cover panel 7 to be covered as well, side flaps 9 of panel cover 10 are reliably folded downward, automatically and permanently, in the course of the abovementioned backward displacement of cover panel 7, into their corresponding covering positions 9a according to FIG. 3.

To achieve this, side flaps 9 are mounted to pivot around a geometric axis that runs between them and the opposite side edge of cover panel 7 by means of a hinge strip 16, constantly urged by a spring in the upwardly raised direction, and, when cover panel 7 is displaced rearward together with said flaps, side flaps 9 are pulled down into their covering position by means of a cable arrangement against the spring tension acting on them.

A leg spring 17 is located on side flap 9 to provide spring tension on side flap 9, said spring having one spring leg abutting side flap 9 and the other spring leg abutting cover panel 7. Leg spring 17 is characterized by a long service life and a limited space requirement.

At a lateral distance from hinge strip 16, the rear end of a tension cabling system 18 an associated tensioning cable 18a is fastened under side flap 9. Beginning at this fastening location, cable 18 extends diagonally downward to a round guide of a deflecting device 19 that projects from the underside of cover panel 7, laterally to a point under side flap 9. Cable 18 abuts the round guide over a short portion of its circumference and is then guided around the shaft of a guide mushroom 20 with a head that is beveled in the shape of a wedge, said head projecting downward in the area of hinge strip 16. By partially wrapping around guide mushroom 20, tensioning cable 18 is deflected into the lengthwise direction of the vehicle and extends forward to a fixed attachment point on bearing bracket 14, at which the forward end of tensioning cable 18 is fastened by hooking it to an eye.

Since the forward end of tensioning cable 18 is thus held at a fixed point, deflecting device 19, upon the backward displacement of cover panel 7 supporting it, is moved to an appropriate degree from the parcel shelf position shown in FIG. 2 into the position in which it abuts rear lid 11 as shown in FIG. 3. As a result, the round guide and guide mushroom move relative to tensioning cable 18. Since the line of influence of the tensioning cable portion that is fastened to side flap 9, as a result of the laterally offset arrangement of the round guide of deflecting device 19, even with side flap 9 raised, still runs laterally next to the axis of hinge strip 16, side flap 9 is pulled downward against the spring that urges it into its covering position as shown in FIG. 3, while tensioning cable 18 is displaced as well, wrapped around the round guide and guide mushroom 20.

In order to ensure that tensioning cable 18 cannot slide down off the round guide or guide mushroom 20 especially when tensioning cable 18 has been largely relieved of its load in the parcel shelf position according to FIG. 2, the round guide is covered by a bent tab to form an eye and, at a distance from and next to guide mushroom 20, a locking pin 21 is located axially parallel on the supporting panel of deflecting device 19, with a projecting locking plate covering the head of guide mushroom 20 at a short distance.

In the pulled-down covering position of side flaps 9 as shown in FIG. 3, tensioning cables 18 are subjected to considerable tension, so that in an attempt to lift side flaps 9 out of their covering position, undesired damage to side flaps 9 themselves or to adjoining components can occur. In order to prevent such damage to the greatest extent possible, a forward end area that does not wrap around deflecting device 19, can be extended under excessive tensile stress without being destroyed. For this purpose, the end area is formed by a compression spring arrangement that comprises a coiled compression spring 22 supported axially in a sleeve 23 surrounding it. The forward end of sleeve 23 is connected directly by means of the eye and thus supported on bearing bracket 14. The turns of spring 22 located in sleeve 23 are traversed coaxially by tensioning cable 18 that is introduced into sleeve 23, said cable being fastened at its end to a piston that tensions the spring axially. If excessive tensile forces occur in tensioning cable 18, with this arrangement the coiled compression spring 22 is initially compressed without further damage occurring. After the spring travel is exhausted, coiled compression spring 22 stops moving, so that no overextension of this spring, with consequent damage thereto, can occur.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Panel covering for a forward area of a frame opening of a top storage compartment having a rear lid in which, with the rear lid open, a folding top with a fixed rear end can be folded inward, wherein:

the panel cover comprises a cover panel that serves as a parcel shelf when the folding top is closed, said cover panel being displaced rearward when the top is open;

a pair of side flaps arranged with mirror symmetry, articulated at their ends, movement of the side flaps being mechanically controlled by a tensioning cable system that depends on a position of the cover panel that is displaceable in a lengthwise direction of a vehicle, further wherein each of the side flaps are constantly under spring tension in an upwardly folded direction and each is capable of being folded down and back into a covering position by displacement of the cover panel rearward into a covering position by a tensioning cable of the tensioning cable system, said tensioning cable being fixed at a forward end, and a deflecting device being provided on lateral end areas of the cover panel for each corresponding tensioning cable fastened at its rear end to the side flap.

2. Panel cover according to claim 1, wherein an area of the tensioning cable has a length that can change in a spring-elastic manner when subjected to excessive tensile stress.

3. Panel cover according to claim 2, wherein a dimension of this length can be changed by a compression spring arrangement.

4. Panel cover according to claim 3, wherein the compression spring of the compression spring arrangement is located in a sleeve that surrounds it.

5. Panel cover according to claim 4, wherein the sleeve forms one end of the tensioning cable.

6. Panel cover according to claim 1, wherein a guide mushroom with a wedge-shaped head is provided at the deflecting device, said mushroom having tensioning cable wrapped around at least a portion of its circumference.

7. Panel cover according to claim 6, wherein partial wrapping of the tension cable around the guide mushroom is secured by a locking member.

8. Panel covering assembly for a forward area of a frame opening of a convertible top storage compartment, comprising:

a folding top with a fixed rear end which can be folded inward and having a cover panel that serves as a parcel shelf when the top is closed, said cover panel being displaceable rearward when the top is open, and side flaps arranged with mirror symmetry at opposite vehicle lateral sides of the cover panels, wherein the side flaps are constantly under spring tension in an upwardly folded direction and each is capable of being folded down and back into its covering position by displacement of the cover panel rearward into a covering position by means of a cable of a tensioning cable system, a deflecting device being provided on lateral end areas of the cover panel for the corresponding tensioning cable fastened at its rear end to the side flap.

9. Panel cover assembly according to claim 8, wherein a area of the tensioning cable has a length that can change in a spring-elastic manner when subjected to excessive tensile stress.

\* \* \* \* \*